United States Patent
Porter et al.

(10) Patent No.: US 8,046,831 B2
(45) Date of Patent: Oct. 25, 2011

(54) AUTOMATING SOFTWARE SECURITY RESTRICTIONS ON SYSTEM RESOURCES

(75) Inventors: Wayne Porter, Kirtland, OH (US); Chris Criswell, Proctorville, OH (US); Jan Hertsens, Barboursville, WV (US); Robert Egan, Marietta, GA (US)

(73) Assignee: Actiance, Inc., Belmont, CA (US)

( * ) Notice: Subject to any disclaimer, the term of this patent is extended or adjusted under 35 U.S.C. 154(b) by 1186 days.

(21) Appl. No.: 11/368,025

(22) Filed: Mar. 2, 2006

(65) Prior Publication Data

US 2007/0209076 A1 Sep. 6, 2007

Related U.S. Application Data

(60) Provisional application No. 60/657,985, filed on Mar. 2, 2005, provisional application No. 60/657,962, filed on Mar. 2, 2005.

(51) Int. Cl.
*G06F 11/00* (2006.01)
*G06F 15/173* (2006.01)

(52) U.S. Cl. .......... 726/22; 726/2; 726/23; 726/24; 726/25; 726/26; 726/27; 709/225; 709/226; 717/115

(58) Field of Classification Search .......... 726/2, 22–27; 713/1, 2; 709/225, 226; 717/115
See application file for complete search history.

(56) References Cited

U.S. PATENT DOCUMENTS

| | | | |
|---|---|---|---|
| 6,243,451 B1 * | 6/2001 | Shah et al. | 379/201.03 |
| 6,272,641 B1 * | 8/2001 | Ji | 726/24 |
| 6,505,300 B2 * | 1/2003 | Chan et al. | 713/164 |
| 6,711,686 B1 | 3/2004 | Barrett | |
| 7,350,237 B2 * | 3/2008 | Vogel et al. | 726/27 |
| 7,379,984 B1 * | 5/2008 | Green | 709/220 |
| 7,383,569 B1 * | 6/2008 | Elgressy et al. | 726/2 |
| 2002/0073312 A1 * | 6/2002 | Adiano et al. | 713/165 |
| 2002/0099952 A1 | 7/2002 | Lambert et al. | |
| 2004/0237069 A1 * | 11/2004 | Colgrave | 717/115 |
| 2004/0255167 A1 * | 12/2004 | Knight | 713/201 |
| 2005/0021980 A1 | 1/2005 | Kanai | |
| 2005/0166198 A1 * | 7/2005 | Gigliotti et al. | 717/172 |
| 2005/0177817 A1 * | 8/2005 | Arcaro et al. | 717/108 |
| 2005/0188419 A1 * | 8/2005 | Dadhia et al. | 726/1 |
| 2005/0278709 A1 * | 12/2005 | Sridhar et al. | 717/136 |
| 2005/0278785 A1 * | 12/2005 | Lieberman | 726/24 |
| 2006/0101522 A1 * | 5/2006 | Rothwell et al. | 726/26 |
| 2006/0179484 A1 * | 8/2006 | Scrimsher et al. | 726/23 |
| 2006/0195899 A1 * | 8/2006 | Ben-Shachar et al. | 726/12 |
| 2007/0180490 A1 | 8/2007 | Renzi et al. | |
| 2007/0261124 A1 * | 11/2007 | Centonze et al. | 726/27 |
| 2008/0109912 A1 * | 5/2008 | Rivera | 726/30 |
| 2010/0146584 A1 * | 6/2010 | Haswarey et al. | 726/1 |

* cited by examiner

*Primary Examiner* — Nathan Flynn
*Assistant Examiner* — Sarah Su
(74) *Attorney, Agent, or Firm* — Kilpatrick Townsend & Stockton LLP (57) ABSTRACT

Security components of managed computers are configured using inoculation data. Inoculation data can be retrieved from an inoculation data provider. The inoculation data provider analyzes unauthorized software applications to develop inoculation data. The inoculation data configures the security component to deny access to resources to unauthorized software applications. Inoculation data can be embedded into a script, which is distributed via a management protocol to one or more managed computers from a management computer. Resources can include files, storage paths, memory, registry keys, processor priority, services, dynamic link libraries, archives, browser cookies, and/or ActiveX controls, Java applets, or classes thereof.

32 Claims, 10 Drawing Sheets

AUTOMATING SOFTWARE SECURITY RESTRICTIONS ON SYSTEM RESOURCES

CROSS-REFERENCES TO RELATED APPLICATIONS

This application claims priority to U.S. Provisional Patent Application Nos. 60/657,985, filed Mar. 2, 2005 and 60/657,962, filed Mar. 2, 2005, both of which are incorporated by reference herein for all purposes. Additionally, this application is related to U.S. patent application Ser. No. 11/368,029, filed Mar. 2, 2006 and entitled "AUTOMATING SOFTWARE SECURITY RESTRICTIONS ON APPLICATIONS", which is incorporated by reference herein for all purposes.

BACKGROUND OF THE INVENTION

The present invention relates to the field of computer security, and more particularly, to protecting computers against the installation or execution of unauthorized software. Unauthorized software applications can include self-propagating software applications, such as computer viruses, trojans, and worms; software intended to commercially exploit users, such as spyware or adware; malicious software or malware; surveillance applications such keyloggers, screen capturing programs, and web tracking programs; and software intended to conceal its own existence and/or the existence of other applications, such as rootkits; as well as any other type of software application, script, macro, or other executable instructions intended to operate on a computer system without the permission of the computer user and/or a system administrator.

One approach to protecting against the execution of unauthorized software on a computer is to scan the computer periodically for the presence of such software, in memory and on disk. If unauthorized software is found, the software can be removed. There are several problems with this approach. Performing the scan can take a significant amount of system resources (e.g., CPU cycles, disk accesses), even when done in the background. This leads some users to avoid the procedure. Yet to have maximum effect, the scan should be performed frequently. Furthermore, the scan only detects unauthorized software that is already present on the computer. Therefore, unauthorized software may have already caused inconvenience or damage by the time it is detected and removed.

A different approach is to prevent unauthorized software from installing on the computer in the first place. This approach uses security features provided by the operating system. A system administrator can create and deploy software restrictions that prevent unauthorized software from installing, executing, or accessing computer resources.

Existing solutions using this approach require system administrators to gather information about unauthorized software, and to use this information to create software restrictions that protect against the software. Previously, the process used to create and update software restrictions requires the system administrators to manually input information about the unauthorized software. This manual process is inefficient and time-consuming. In some cases, the system administrator must actually have a copy of the software application to create an effective software restriction that blocks this software application. Thus, system administrators are often reacting to unauthorized software applications (and repairing the damage wrought by these applications), rather than preventing them from being executed in the first place. Moreover, the creators of unauthorized software may change these software applications frequently to produce many variants to bypass detection and previous software restrictions. As a result, existing approaches require system administrators to be constantly creating and updating software restrictions to protect against each variant.

It is therefore desirable for a system and method to automatically generate inoculation data to implement software restrictions that prevent authorized software applications from executing and/or accessing system resources. It is further desirable that the system and method to readily deploy inoculation data to managed computer systems to facilitate software restrictions in response to new or frequently changed unauthorized software applications. It is further desirable that the system and method disable countermeasures and defensive mechanisms of unauthorized software applications to facilitate their removal. It is also desirable for the system and method to implement preventative software restrictions against unauthorized software applications prior to any appearance of the applications on any managed computers.

BRIEF SUMMARY OF THE INVENTION

Security components of managed computers are configured using inoculation data. Inoculation data can be retrieved from an inoculation data provider. The inoculation data provider analyzes unauthorized software applications to develop inoculation data. The inoculation data configures the security component to deny access to resources to unauthorized software applications. Inoculation data can be embedded into a script, which is distributed via a management protocol to one or more managed computers from a management computer. Resources can include files, storage paths, memory, registry keys, processor priority, services, dynamic link libraries, archives, browser cookies, and/or ActiveX controls, Java applets, or classes thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention.

DETAILED DESCRIPTION OF THE INVENTION

Security components, which include access control components and other defensive mechanisms of computer systems and their operating systems, protect against unauthorized software applications. Security components may be built into an operating system and/or may be an application separate from the operating system. Security components typically must be configured to identify and protect against specific unauthorized software applications. Inoculation data is data used to configure one or more security components to protect against unauthorized software applications. The set of inoculation data configuring security components to protect against unauthorized software applications are referred to collectively as software restrictions.

An embodiment of the invention automatically generates inoculation data to prevent unauthorized software applications from executing and from accessing system resources, such as memory; disk storage; processor threads; operating system and program services; configuration databases and files, such as the Windows registry; dynamic link libraries (DLLs) and equivalents; paths, .ZIP, .JAR, .CAB, and other types of archives; browser cookies; ActiveX controls, Java applets, or classes thereof, and processor priority. An embodiment of the invention further enables the deployment and installation of inoculation data on one or more managed computer systems. Scripts facilitate the configuration of security components with inoculation data implementing one or more software restrictions.

Figure 1:
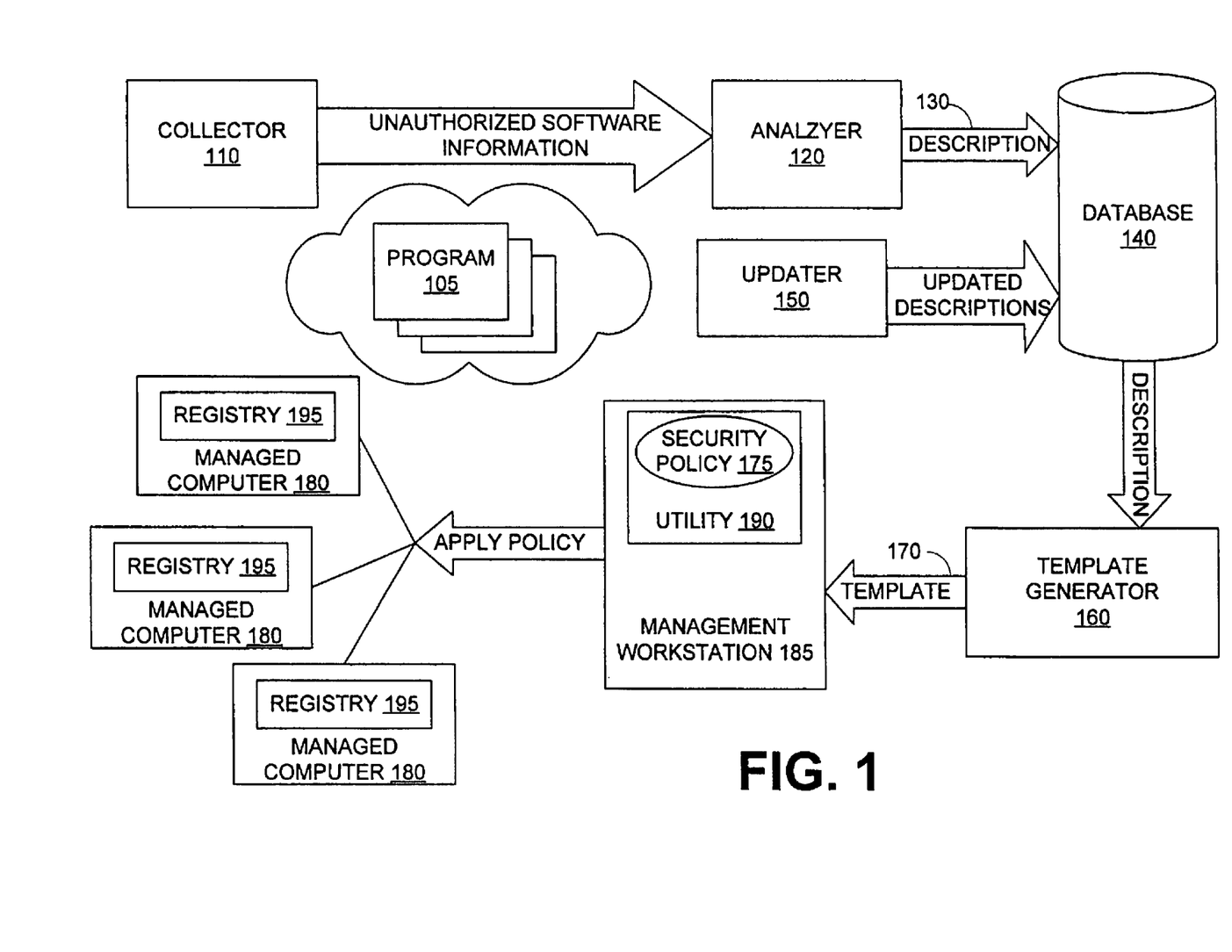
FIG. 1 is a block diagram illustrating the environment of the method for automating the creation of scripts including inoculation data.

FIG. 1 is a block diagram of an environment in which the method for automating the creation of scripts including inoculation data can be implemented. A data collector software component 110 collects information about unauthorized software programs 105 such as viruses, adware, spyware, and other unwanted programs. The raw information is provided to an analyzer 120, which analyzes the information to characterize and describe each unauthorized software program. Descriptions 130 of unauthorized software are stored in a database 140. An update software component 150 uses these descriptions 130 to search the Internet for mutations or variations of already-known software, and to update the database 140 with information about discovered variants.

In an embodiment, data collector software component 110 is an automated reporting system, analyzer 120 is includes applications and/or trained users, and the update software component 150 is a web-crawler (also known as a spider or a bot). The reporting system receives submissions about suspected or known viruses, adware, spyware, etc. The analyzers review submissions and determine if information collected about a particular software program 105 is enough to characterize it and to include it in the database 140. In another embodiment, the analyzer 120 is a software component.

Data collector software component 110 can include system monitoring and reporting applications operating on numerous computer systems. Data collector software component 110 can be built into other anti-spyware, anti-virus, firewall, or other security applications to facilitate gathering information on new unauthorized software applications. Data collector software component 110 can also be installed on honeypot computer systems, which are systems that are configured to be deliberately exposed to unauthorized software applications to gather information about new unauthorized software applications.

A further embodiment of the data collector software component 110 can use data extracted from unauthorized software applications with publicly available or private Internet search engines to search for web sites and other network locations hosting the unauthorized software application. These web sites and network locations can be analyzed to identify distribution methods of unauthorized software applications, such as ActiveX controls, Java applets, or classes thereof, as well as potential new unauthorized software applications. Similarly, instant messaging networks, peer-to-peer networks, and other types of overlay and "gray" networks can be monitored for suspicious data payloads.

The description 130 of unauthorized software stored in the database 140 includes one or more of the items listed in Table 1. Some of the items describe an unauthorized software program in terms of what it is. That is, these items identify characteristics of the software itself. Some of the items describe the software in terms of what it does when it installs and/or executes on a computer.

TABLE 1

| Item | Description |
| --- | --- |
| ClassId | software needs an identifier in order to install under Windows; chosen by software author |
| Filename | name of the file containing the unauthorized software, or a file used by the software |
| Uniform Resource Locator | software is downloaded from this address |
| Directory Location | unauthorized software writes files to this location |
| Service Name | unauthorized software starts this Windows service |
| Registry Key | unauthorized software writes values to this key in the registry |

The script generator 160 extracts the software descriptions 130 from the database 140 to automatically create a script including inoculation data 170. The script 170 is a file which describes a software restriction 175. When applied to one or more managed computers 180, the software restriction 175 protects those computers from the installation and/or execution of the unauthorized software described by the descriptions 130. (Software restrictions will be discussed in more detail in connection with FIG. 2.)

Advantageously, the generator 160, produces the script 170 in a format that is directly usable by the management workstation 185. Generating a script including inoculation data thus involves translating, or mapping, the descriptions 130 into a software restriction 175 using this format. The script format will be described in more detail in connection with FIG. 6. The translation procedure will be described in more detail in connection with FIG. 9.

Once created, the software restriction 175 in the script 170 is applied to one or more managed computers 180 by a system administrator using a management workstation 185. The script 170 is downloaded or copied to the workstation 185. Using a management utility 190 on the workstation 185, a system administrator imports the software restriction 175 from the script 170, where importing consists of associating a policy with a script file.

In an embodiment, the workstation 185 and the managed computers 180 use a version of the Microsoft Windows® as an operating system, and also use Microsoft ActiveDirectory® as a directory service to manage network resources. In one embodiment, the utility 190 is the Group Policy Object (GPO) extension ("snap-in") to Microsoft Management Console (MMC). In another embodiment, the utility 190 is the Microsoft SECEDIT program, a utility that allows an administrator to import and apply the script 170 through command-line arguments or a script rather than through user interaction.

After importing the software restriction 175, the system administrator applies the restriction to one or more managed computers 180. The policy can be applied to one computer, any subset of managed computers 180, or all of the managed computers 180. The application of the software restriction 175 to a managed computer 180 stores the software restriction 175 in a registry 195 on that managed computer 180. The registry 195 is a configuration database that stores many types of computer-specific and user-specific data associated with a particular managed computer 180.

Using the script file 170 to apply the software restriction 175 greatly simplifies the process of hardening one or more managed computers 180 against unauthorized software. A script file 170 contains a description of a particular security policy 175. Therefore, instead of using a management utility to manually enter all the data in this description (which may contain multiple unauthorized programs), the system administrator simply associates a policy with script file 170.

Figure 2:
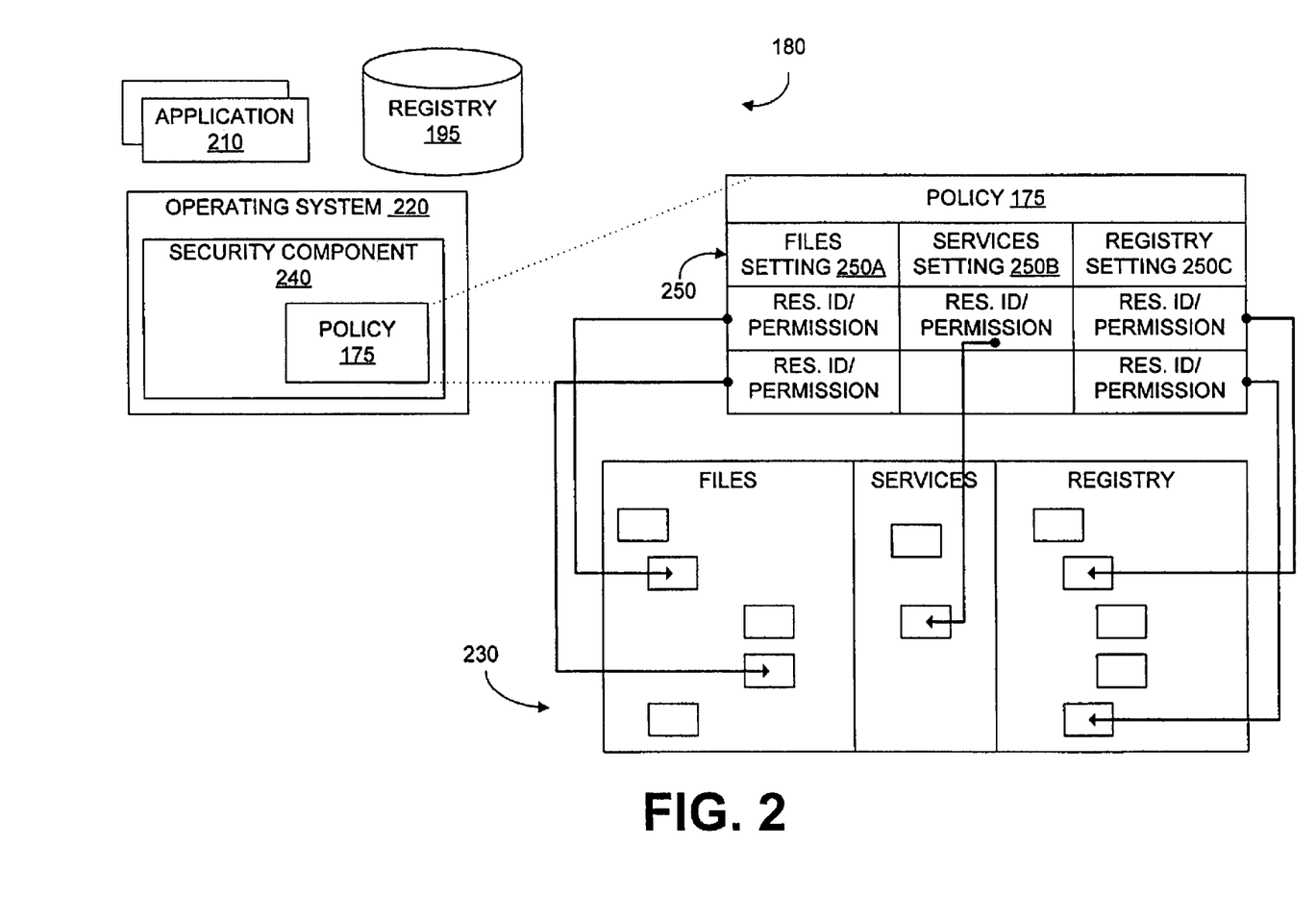
FIG. 2 is a block diagram illustrating one embodiment of the managed target computer system of FIG. 1.

The software restriction 175 protects managed computer 180 against unauthorized software as follows. As shown in FIG. 2, the managed computer 180 contains one or more executable programs 210, such as programs 210*a* and 210*b*. One or more of the executable programs 210 may be considered unauthorized programs. The managed computer 180 also includes the registry 195, an operating system 220, and a security component 240. In an embodiment, the security component 240 can be included within the operating system 220. For example, the Group Policy Management Console component of the Microsoft Windows operating system includes objects, such as group policy objects, adapted to selectively block execution of programs. To implement software restrictions, group policy objects can be installed directly on managed computers or distributed from a management workstation to one or more managed computers via a data communications network, for example using the Microsoft Windows Active Directory replication feature, LDAP, or any other management protocol. Similar access control enforcement mechanisms are available for many other operating systems, such as Unix, Linux, AppleOS, and Solaris, to allow, block, or throttle, or otherwise control access to applications and system resources. System administrators can select all or a portion of the computer systems under their control to receive and install the inoculation data, thereby implementing the software restrictions.

The software restriction 175 protects managed computer 180 against unauthorized software as follows. As shown in FIG. 2, the managed computer 180 contains one or more applications 210, operating system 220, and system resources 230, and controls access to system resources 230 based on inoculation data settings 250 within software restriction 175. In an embodiment, security component 240 is part of operating system 220. In embodiments of the invention, the security settings 250 may be stored in the registry 195, any other type of store of system configuration information, as part of the security component 240, and/or in a separate file or data structure stored by the managed computer 180; a management workstation 185, discussed above; or by any other data storage resource connected with the managed computer 180 via a data communications network.

In an embodiment, each security setting 250 defines a specific system resource (e.g., file, directory, Windows service, registry location). Each security setting 250 further defines permissions for that resource, where a permission specifies an access type (e.g., read, execute, write, create) for one or more users or groups of users. File System Setting 250A controls access to the file system (files and directories). Registry Setting 250B controls access to the registry. Services Setting 250C controls access to Windows services.

For example, the installation procedure for most programs involves copying files and/or writing to a configuration database known as the registry. A software restriction 175 protects against the installation of an unauthorized software program 105 by denying access by unauthorized software applications to the relevant file, directory, or registry location. Software restriction 175 can provide additional protection against execution of an unauthorized software program 105 by denying the program permission to execute.

Figure 3:
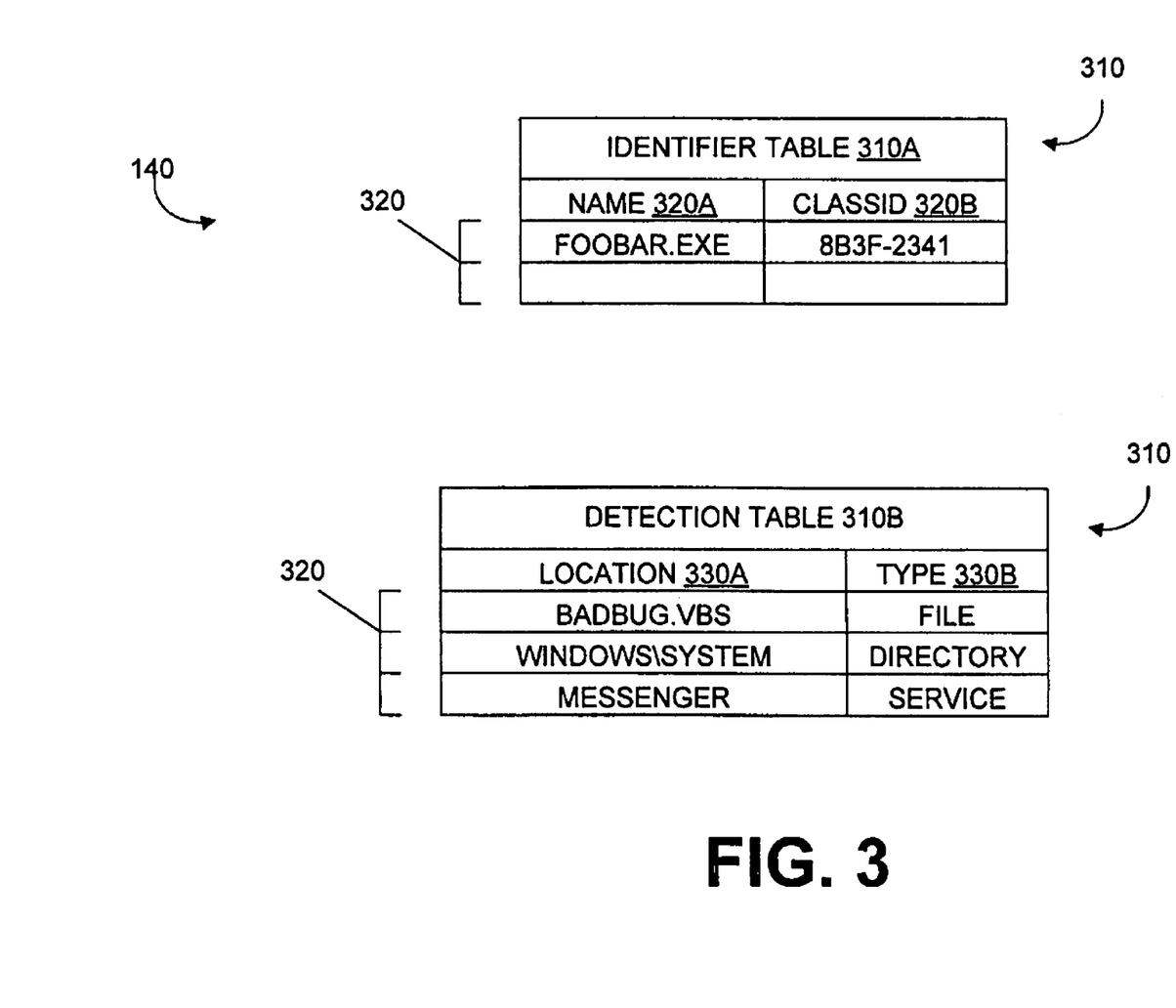
FIG. 3 is a block diagram illustrating one embodiment of database 140 from FIG. 1.

As discussed in connection with FIG. 1, before a software restriction 175 is created, the unauthorized software 105 is first characterized, and its description 130 stored in the database 140. FIG. 3 is a block diagram illustrating one embodiment of the database 140. The database 140 comprises one or more tables 310, with each table containing rows 320. Each row 320 represents a set of one or more attributes describing a particular unauthorized software program 105. A description 130 thus comprises one or more rows 320 of one or more tables.

In the embodiment of FIG. 3, the description 130 is split among multiple tables 310A and 310B. One table (310A) contains columns for those items, or attributes, that identify an unauthorized software program 105 (i.e., what it is). This identifier table 310A contains a Name column 320A and a Class Identifier column 320B. The other table (310B) contains columns for those items that do not strictly identify the program, but can be used to detect it based on how it behaves during installation. This detection table 310B contains a Location column 330A and a Type column 330B. Location column 330A represents a location accessed by the unauthorized software program 105. The type of location depends on the value in Type column 330B, e.g., file, directory, registry, service.

A software program has at most one set of identification attributes. However, a particular program may have multiple detection attributes, since it may access multiple locations of various types. Therefore, the complete set of attributes describing a program can include multiple rows from Table 310B.

Figure 4:
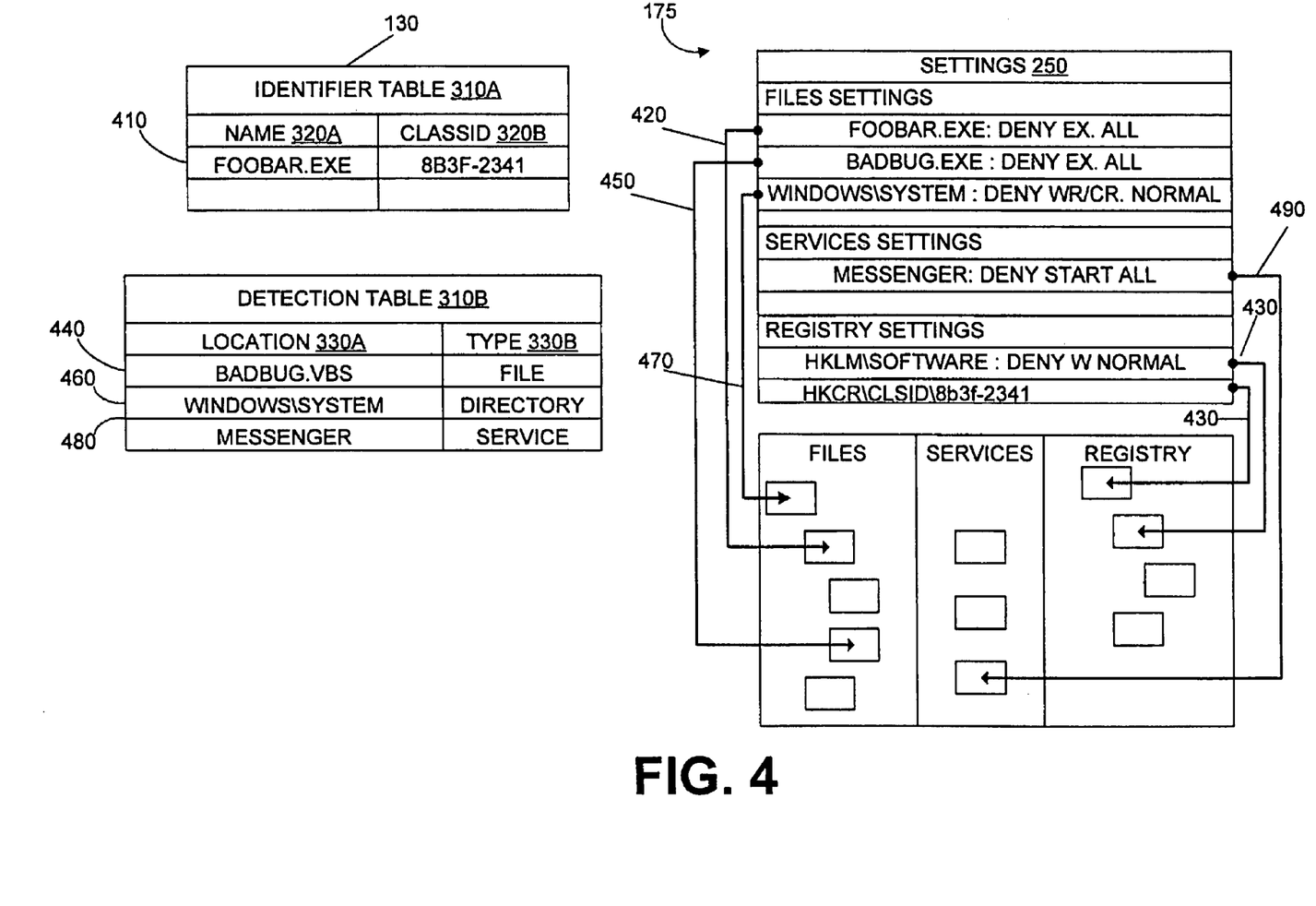
FIG. 4 is a block diagram illustrating the correspondence between database 140 of FIG. 1 and software restriction 175 of FIG. 1.

FIG. 4 illustrates example descriptions 130 in the database 140 corresponding to security settings 250 within a software restriction 175 according to an embodiment of the invention. Row 410 describes a program 105 which can be identified by name ("FOOBAR.EXE") or by Class Identifier ("8b3f-2341"). This description corresponds to two inoculation data settings which protect against this unauthorized program 105. These two settings are: setting 420, which denies execution of "FOOBAR.EXE" to all users; and setting 430, which denies writes by normal users (e.g., not administrators) to a registry key associated with the ClassIdentifier "MM-2341". (Both the registry and Class Identifiers will be described in more detail below in connection with FIG. 5.)

In this example, row 440 describes a program which can be identified by name ("BADBUG.VBS"). This description corresponds to a single inoculation data setting 450 which protects against this unauthorized program 105 by denying execution of "BADBUG.VBS" to all users.

In this example, row 460 describes a program which installs files in the Windows system directory. This description corresponds to inoculation data setting 470 which protects against this unauthorized program 105 by denying normal users write/create access to the Windows system directory.

In this example, row 480 describes a program that starts the "Messenger" service. This description corresponds to inoculation data setting 490 which protects against this unauthorized program 105 by denying users the ability to start the "Messenger" service.

The concepts of identifying a program by attributes such as a filename, path location, contents or a hash or signature thereof, registry keys or other configuration data, residuals, such as data left behind during installation, or any other characteristic are straightforward and embodiments of the database may include entries with data adapted to identify programs using these attribute. The concept of detecting installation of a program by actions on the registry will now be explained in more detail.

Figure 5:
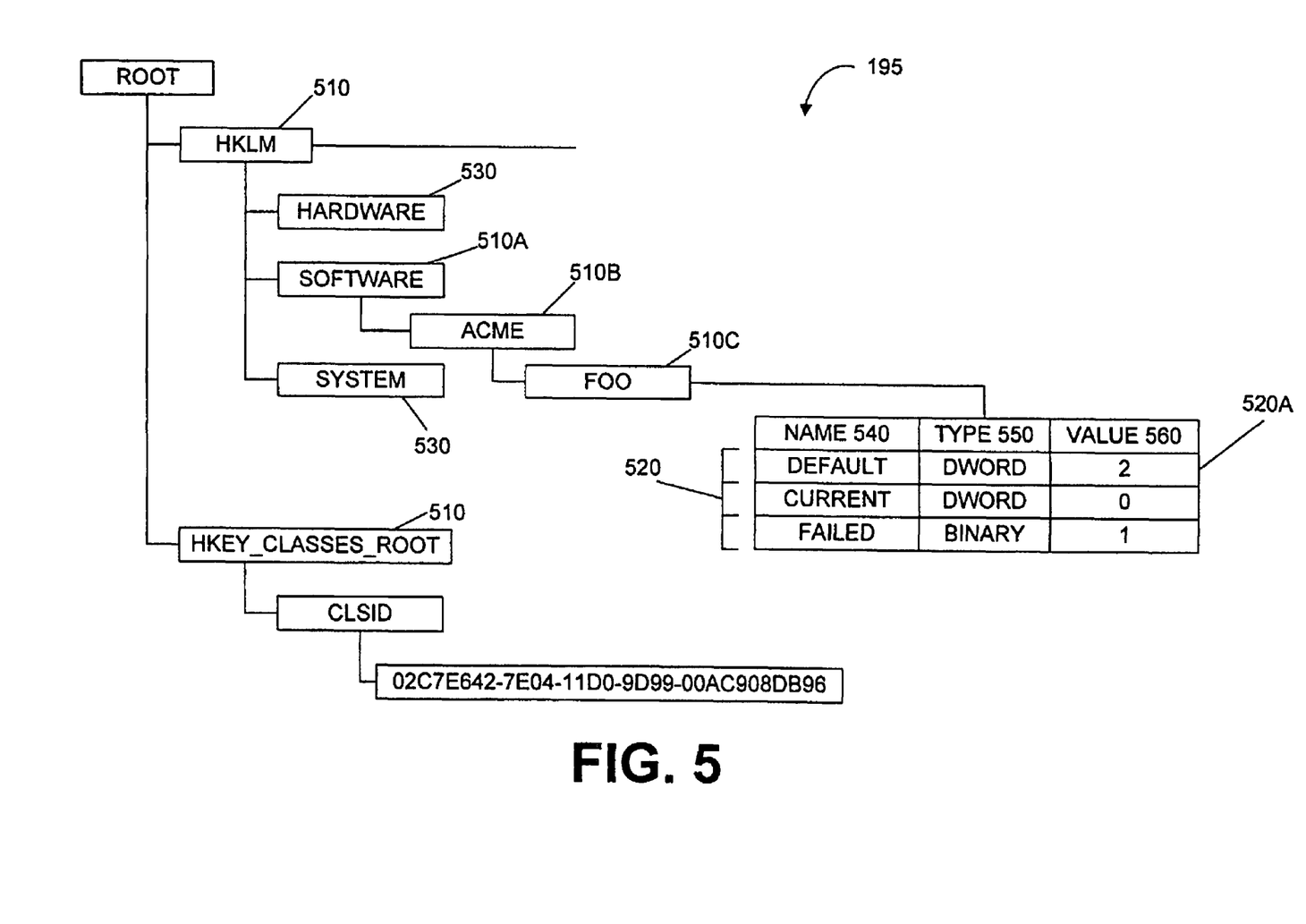
FIG. 5 is a block diagram illustrating the registry of the managed target computer system of FIG. 1.

FIG. 5 is a block diagram illustrating an example registry 195 of managed computer 180. The registry 195 is a configuration database stored on each Windows computer 180. In this example, the registry 195 is logically arranged in a tree-like hierarchy. The tree is populated with registry keys 510. Each key 510 can have value entries 520, which store settings. Each key 510 can also have subkeys 530, which are themselves keys. Each value entry 520 has a name 540, a type 550, and a value 560. A particular value entry 520 is located under a particular key 510, and can be identified by a path from the root key to this key. In the registry 195 of FIG. 5, for example, key 510C can be identified as "HKLW Software\Acme\Foo." Value entry 520A, named "Default" is located under key 510C. Value entry 520A has type DWORD, and Value=2.

Several registry keys are involved in software installation. Software programs store their configuration information as under the HKLM\Software key (510A). Therefore, the installation process for a software program creates a vendor key 510B (usually the company name), and then under that key, a subkey 510C for the particular program. In the example registry of FIG. 5, the vendor key is "Acme" and the program subkey is "Foo." The install process may also create default value entries 520 under the program subkey.

Another registry key often used during software installation is HKEY_CLASSES_ROOT (HKCR). This subkey is used by Windows software that includes one or more Component Object Model (COM) classes. COM classes are simply pieces of functionality and data that a program can call at runtime to perform a specific task. For example, the behavior of a button on a form might be defined by a COM class. When that button class is invoked by an application and the user clicks the button, the functionality defined by that class is executed.

Classes are identified in the Registry by unique Class Identifiers (CLSIDs), which are represented as a 32-character hexadecimal number. When the installation process installs a Windows COM class, it creates a key for that class under HKCR\CLSID. In the example registry of FIG. 5, the key is HKCR\CLSID\02C7E642-7E04-11D0-9D99-00A0C908DB96.

File associations are also stored under the HKCR key. Thus, if an unauthorized program is associated with a file type, the install process reads the subkeys of HKCR to find one for the appropriate file type, and writes value entries to that subkey.

Further types of rules can be stored in the registry in a similar manner.

In an embodiment, software restriction 175 can be manually entered into the registry or other configuration database of the managed computer system. In a further embodiment, the utility of a software restriction 175 is improved by generating and saving the software restriction 175 as a script 170 that is directly usable by the registry utility 190.

Figure 6:
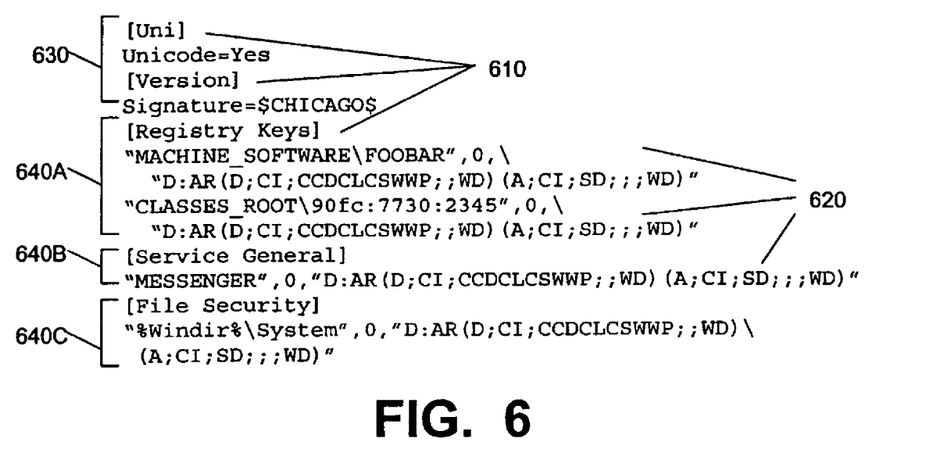
FIG. 6 is a block diagram illustrating the format of script 170 from FIG. 1.

FIG. 6 illustrates the format of an example script 170 embodying a software restriction 175 according to an embodiment of the invention. Example script 170 is in a format is supported by Windows® registry utilities 190, such as, but not limited to, REGEDIT. This format is supported by a wide variety of Windows® system administration utilities 190, such as, but not limited to, Group Policy Editor, Security Configuration Manager, and SECEDIT. Additional embodiments of script 170 can be expressed in any other scripting language or format known in the art.

In an embodiment, the script 170 is a text file, divided into headers 610 and entries 620. A header 610 is a string enclosed in brackets. An entry 620 is a string of comma-separated values. If the string spans more than one line, the lines are separated by a backslash character ('\'). Each entry 620 is located below, and associated with, a header 610. A section 620 contains a header 610 and its one or more associated entries 620.

In one embodiment, the script 170 contains an introductory section 630 containing the headers 610 and entries 620 shown in Table 2. The entries in introductory section 630 identify and describe the script format. The $CHICAGO$ signature signifies a format that works with versions of multiple Windows (Windows 95 and later).

TABLE 2

Introductory Section

Unicode
Unicode=Yes
Version
Signature="$CHICAGO$"
Revision--1
[Profile Description]
Description=Protecting a system against unauthorized software Each of the remaining sections (640A, 640B, and 640C) corresponds to one of the inoculation data settings discussed in connection with FIGS. 2 and 4. File System section 640A corresponds to security setting 250A, and contains entries that describe user and program permissions for particular files and directories. Registry Key section 640B corresponds to security setting 250B, and contains entries that describe user and program permissions for particular registry keys. Services section 640C corresponds to security setting 250C, and contains entries that describe user and program permissions for particular Windows services.

Figures 7, 8:
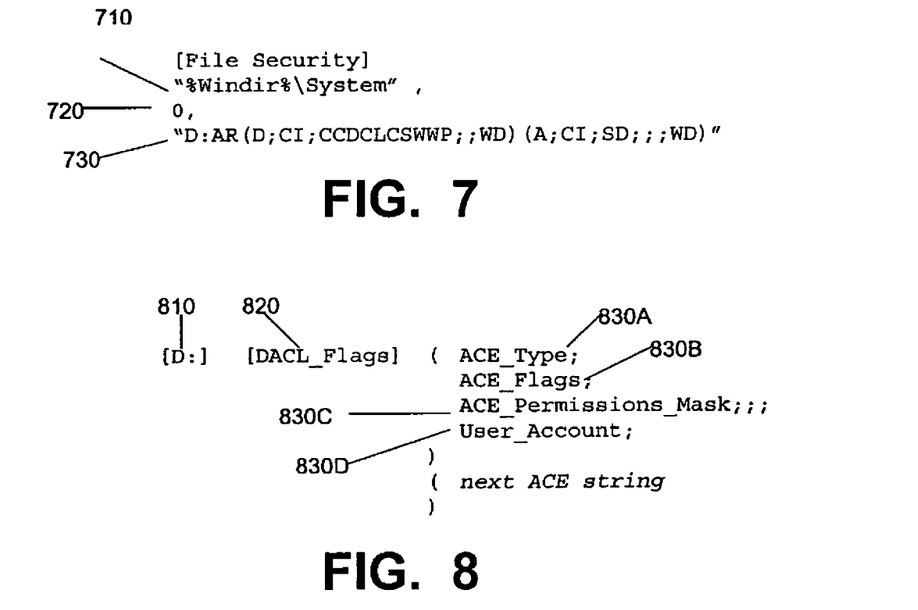
FIG. 7 is a block diagram illustrating the parameters of a registry entry for a security setting as contained in the script of FIG. 6.
FIG. 8 is a block diagram illustrating the DACL string 730 of FIG. 7.

The entries in these security settings sections represent three parameters, illustrated in FIG. 7. In an embodiment, there are three parameters separated by commas. The first parameter is the pathname 710 of the file, directory, or registry key. The second parameter 720 determines whether or not the permission is inherited by subdirectories/subkeys: a value of 0 propagates inheritable permissions; a value of 1 prevents the permission from being replaced; and a value of 2 replaces existing subdirectory/subkey permissions with inheritable permissions. The last parameter 730 is a discretionary access control list (DACL) which describes the permission.

The DACL parameter 730 is a string expressed in Microsoft's Security Descriptor Definition Language (SDDL). The format of the DACL string 730 is illustrated in FIG. 8.

The first portion 810 of the DACL string is 'D: ', which identifies the descriptor as a DACL. The second portion 820 contains a flag that determines whether or not inheritable permissions are allowed: 'AI' means Automatic Inheritance; 'AR' means Automatic Inheritance Requested; and 'P' means Protect Against Inherited Permissions.

The final portion of the DACL string comprises one or more access control entries (ACEs). Each ACE 830 is enclosed in parentheses and includes fields 830A-D which combine to define permissions for a particular type of user account. Permissible values for the ACE_Type field include: A (Allow access); AU (Enables auditing); and D (deny access). Permissible values for the ACE_Flags field include: CI (Subdirectories/subkeys will inherit this ACE); OI (files will inherit this ACE); and NP (no inheritance).

Permissible values for ACE_Permissions_Mask include: FA (all file permissions); FR (file generic read); FW (file generic write); FX (file generic execute); GA (all generic permissions); GR (generic read); GW (generic write); GX (generic execute); KA (all registry key permissions); KR (registry key generic read); KW (registry key generic write); and KX (registry key generic execute). The ACE_Permissions_Mask is a bitmask, and therefore these values can be used in combination.

Permissible values for User_Account include: AN (anonymous login); AO (account operator); AU (authenticated user); BA (built-in administrator); BG (built-in guest); BU (built-in user); CA (certificate server administrator); DA (domain administrator); DG (domain guest); DU (domain user); IU (interactive user); LA (local administrator); NS (network service account); PU (power user); SO (server operator); SY (local system); and WD (everyone).

The first field 830A of the ACE string is a type field. The second field 830B is a flag. The third field 830C contains permissions. The last field 830D of the ACE string specifies the type of user account which the ACE 830 applies to. The fields of the ACE string are separated by semicolons. Two additional semicolons (for a total of three) are used to separate the permission field 830C and the user account field 830D.

Figure 9:
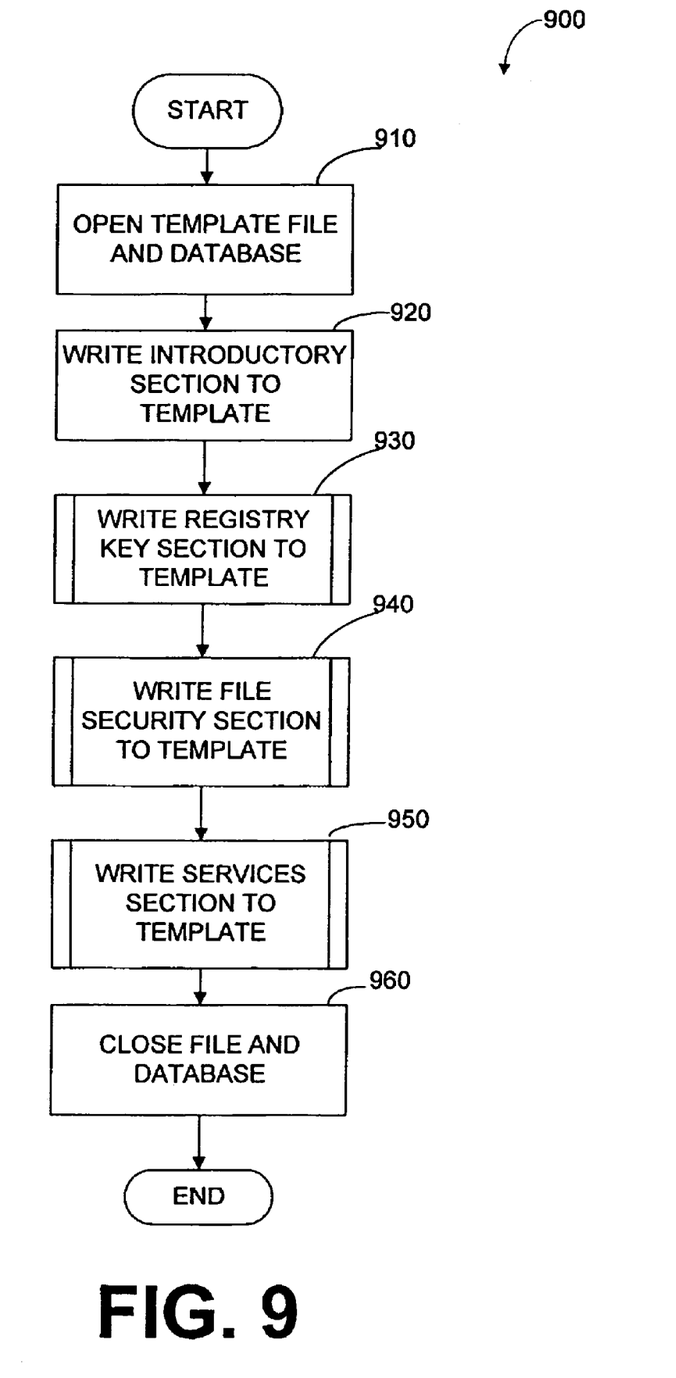
FIG. 9 is a flowchart diagram illustrating the translation process performed by the script generator 160 of FIG. 1.

The script format described in FIG. 6 is used by the script generator 160. The generator 160 maps or translates the descriptions 130 stored in the database 140 into a script 170 having this format. An embodiment of the translation process is illustrated in the flowchart of FIG. 9.

The translation process 900 begins at step 910, where a text file with the extension "INF," is opened, and database 140 is opened. Next, at step 920, generator 160 writes an introductory section 630 to the file. (Introductory section 630 and its contents were described in connection with FIG. 6.) At step 930, generator 160 writes File System section 640A to the file. At step 940, generator 160 writes Registry Keys section 640B. At step 950, generator 160 writes Services section 640C to the file. Finally, at step 960, generator 160 closes script file 170 and database 140. Note that the sections of the INF script file can appear in any order. Therefore, the order of steps 920-950 is unimportant and can vary.

Figure 10:
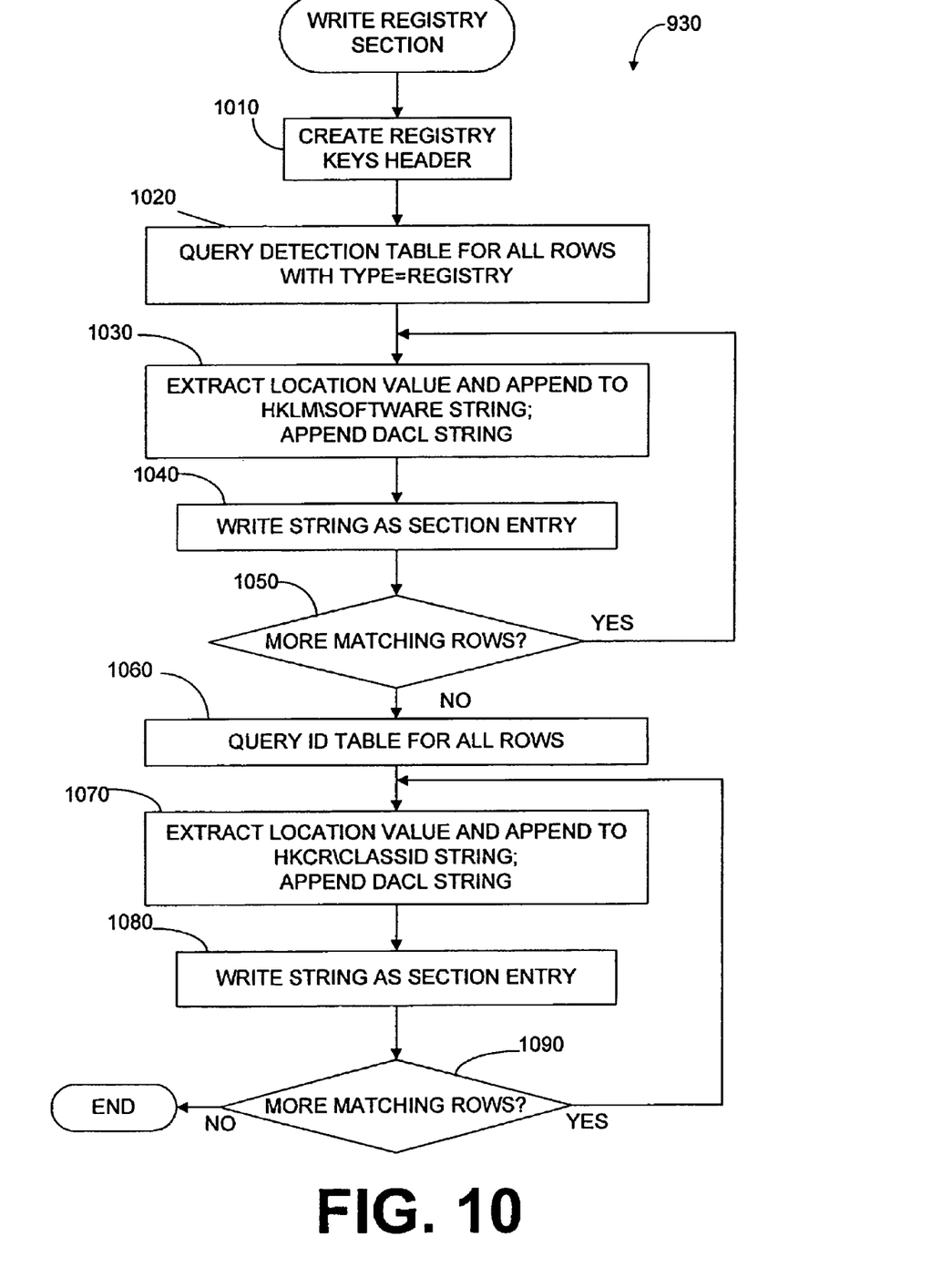
FIG. 10 is a flowchart diagram of the WriteRegistryKeysSection subroutine 930 of FIG. 9.
Figure 11:
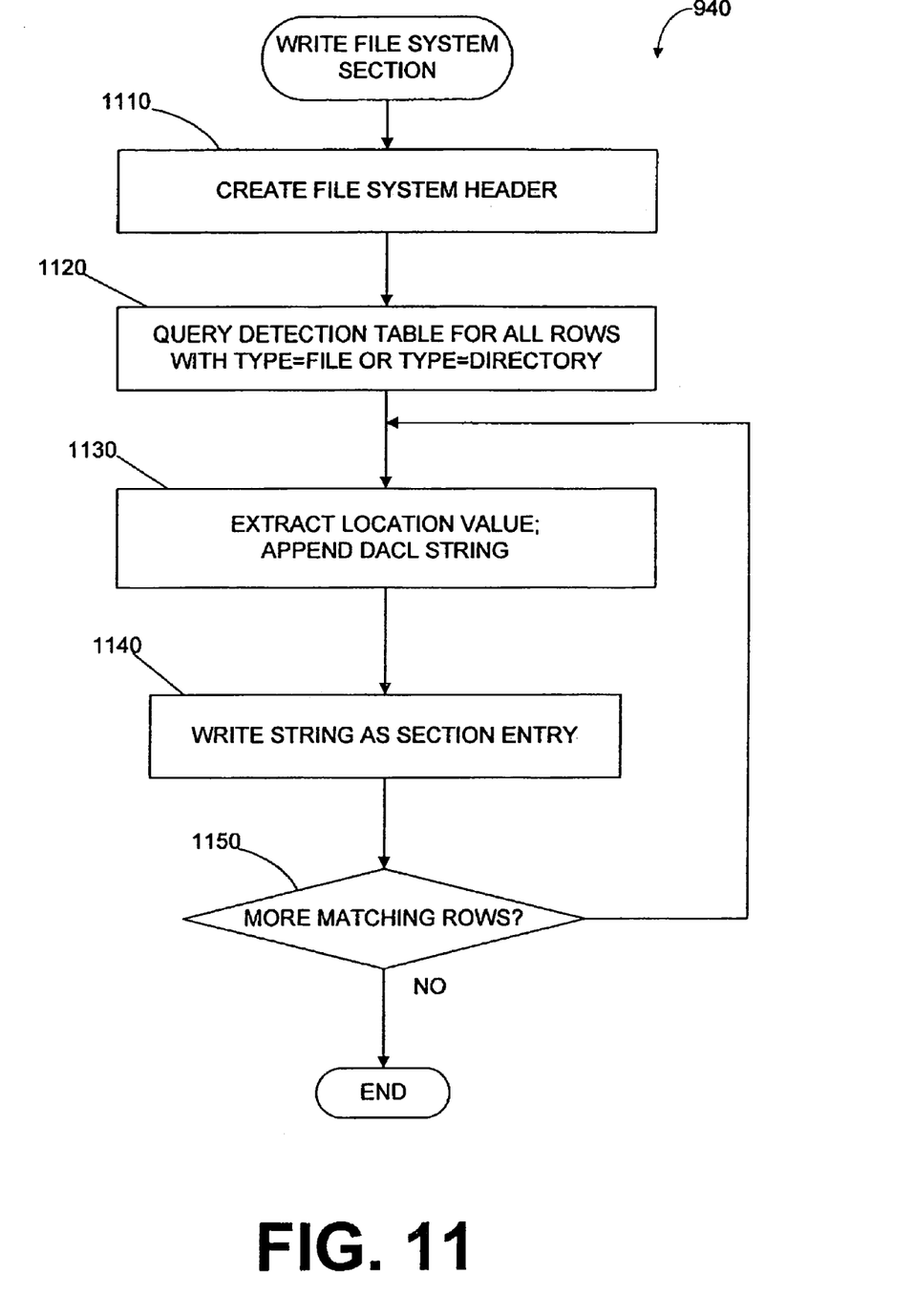
FIG. 11 is a flowchart diagram of the WriteFileSecuritySection subroutine 940 of FIG. 9.
Figure 12:
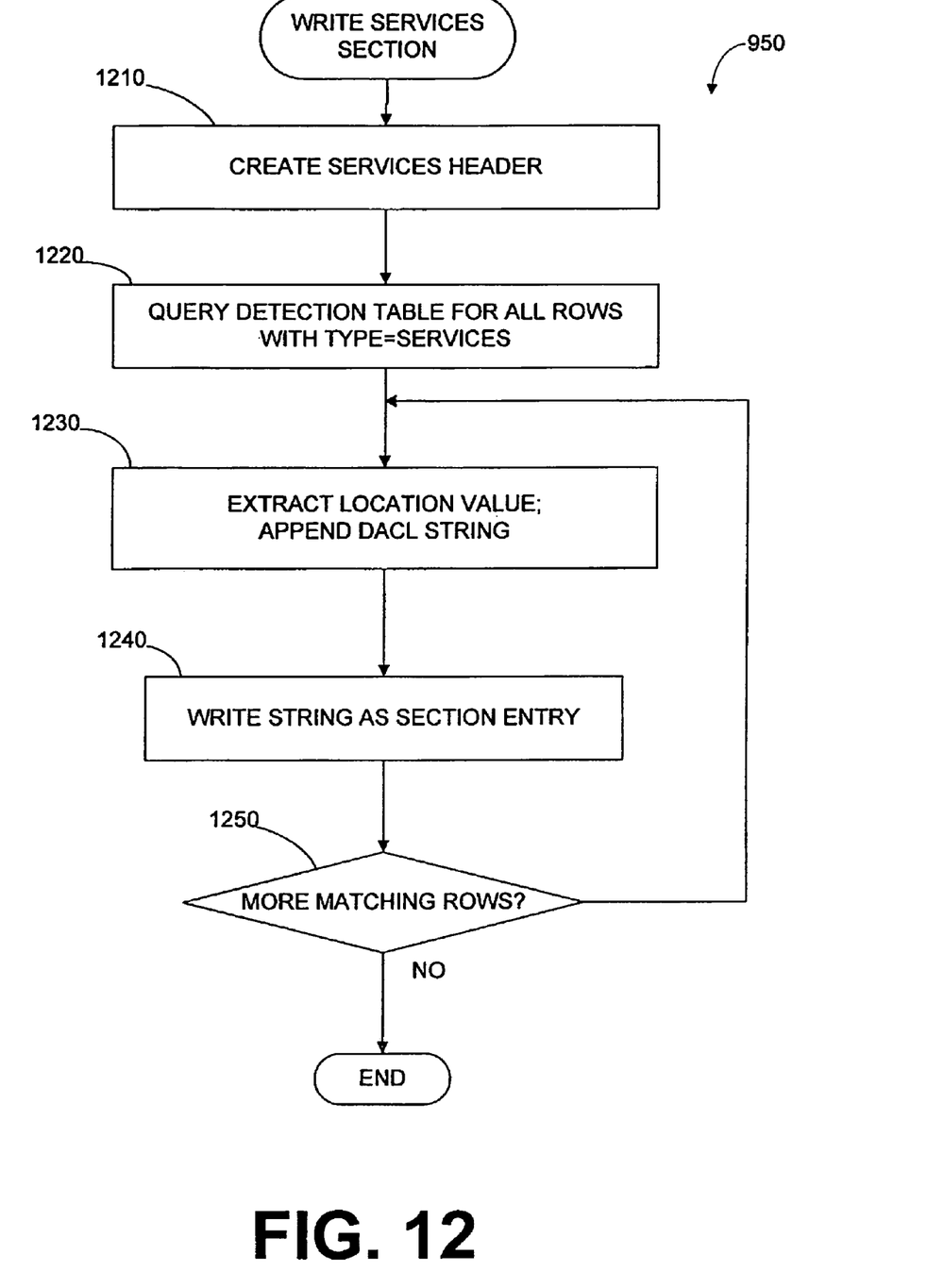
FIG. 12 is a flowchart diagram of the WriteServicesSection subroutine 950 of FIG. 9.

The flowcharts in FIGS. 10-12 further illustrate the details of writing the various sections to script file 170 according to embodiments of the invention. FIG. 10 illustrates the WriteRegistryKeysSection (shown in FIG. 9 as step 940). The process of writing a section begins with step 1010, where a header is created for Registry Keys section 640B. This section will now be populated with entries for registry keys associated with unauthorized software, extracted from database 140.

Detection table 310B in database 140 contains various Locations (330A) accessed by unauthorized software. A Type (330B) is associated with each of the Locations. In step 1020, detection table 310B is queried to find all rows having a value in the Type column 330B that indicates the location type is a registry key. For each matching row, step 1030 extract the Location string and appends it to the string "HKLM\Software." The result is a full-qualified registry key associated with the unauthorized software.

In step 1040, the resulting string is written as an entry in Registry Key section 640B. In another embodiment, database 140 stores the fully-qualified path including "HKLM\Software" and no appending is necessary. At step 1050, the process determines whether or not more matching rows remain to be processed. If No, the process skips to step 1060. If Yes, steps 1020-1040 are repeated until all rows returned by the query have been processed.

At step 1060, a query is made on identification table 310A to extract rows with a value in the Class Identifier column 320B. For each matching row, the Class Identifier string is extracted at step 1070 and appended to the string "HKCR\ClassId." The result is a full-qualified registry key associated with the unauthorized software. A DACL string 730 is appended to the fully-qualified registry key. (The DACL string 730 was described earlier in connection with FIG. 7.)

In step 1080, the resulting string is written as an entry in Registry Keys section 640B. In one embodiment, DACL string 730 is a constant, such that the same DACL string is used for all registry key Locations in identification table 310A. In another embodiment, another column in identification table 310A stores a DACL string specific to the particular registry key Location.

At step 1090, the process determines whether or not more matching rows remain to be processed. If No, the process ends. If Yes, steps 1070-1080 are repeated until rows returned by the query have been processed.

FIG. 11 illustrates the WriteFileSystemSection subroutine (shown in FIG. 9 as step 930). In step 1110, a header is created for File System section 640A. In step 1120, identification table 310A is queried to find all rows having a value in the Type column 330B that indicates the location type is a file or directory. For each matching row, step 1130 extracts the Location string and appends a DACL string 730 to it. (The DACL string 730 was described earlier in connection with FIG. 7.)

In step 1140, the resulting string is written as an entry in File System section 640A. In one embodiment, DACL string 730 is a constant, such that the same DACL string is used for all, file or directory Locations in identification table 310A. In another embodiment, another column in identification table 310A stores a DACL string specific to the particular file or directory Location. At step 1150, the process determines whether or not more matching rows remain to be processed. If No, the process is over. If Yes, steps 1120-1130 are repeated until rows returned by the query have been processed.

FIG. 12 illustrates the WriteServicesSection subroutine (shown in FIG. 9 as step 950). In step 1210, a header is created for Services section 640C. In step 1220, detection table 310B is queried to find rows having a value in the Type column 330B that indicates the location type is a Windows service. For each matching row, step 1230 extracts the Location string and appends a DACL string 730 to it. (The DACL string 730 was described earlier in connection with FIG. 7.) In step 1240, the resulting string is written as an entry in Services section 640C. At step 1250, the process determines whether or not more matching rows remain to be processed. If No, the process skips to step 1260. If Yes, steps 1220-1240 are repeated until rows returned by the query have been processed.

In various embodiments, a general purpose computer can be used to implement the functionality of generator software 160. Generally, in terms of hardware architecture, the computer includes a processor, memory, and one or more input or output (I/O) devices or peripherals that are communicatively coupled via a local interface. The local interface can be, for example but not limited to, one or more buses or other wired or wireless connections, as is known in the art. The local interface may have additional elements (omitted for simplicity), such as controllers, buffers, drivers, repeaters, and receivers, to enable communications. Further, the local interface may include address, control, and data connections to enable appropriate communications among the aforementioned components.

The processor is a hardware device for executing software, particularly that stored in memory. The processor can be any custom made or commercially available processor, a central processing unit (CPU), an auxiliary processor among several processors associated with the computer, a semiconductor based microprocessor (in the form of a microchip or chip set), a microprocessor, or generally any device for executing software instructions.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, or other types of storage media. Note that the memory can have a distributed architecture, where various components are situated remote from one another, but can be accessed by the processor.

The software in the memory may include one or more separate programs, each of which comprises an ordered listing of executable instructions for implementing logical functions. In this example embodiment, the software in the memory includes one or more components of the system for communicating abnormal medical findings, and a suitable operating system. The operating system essentially controls the execution of other computer programs and provides scheduling, input-output control, file and data management, memory management, and communication control and related services, operating system may be any operating system, including, but not limited to, Unix, Linux, Windows®, AppleOS, etc.

The method for automating the creation of scripts including inoculation data is a source program, executable program (object code), script, or any other entity comprising a set of instructions to be performed. When a source program, then the program needs to be translated via a compiler, assembler, interpreter, or the like, which may or may not be included within the memory, so as to operate properly in connection with the operating system.

The peripherals may include input devices, for example but not limited to, a keyboard, mouse, etc. Furthermore, the peripherals may also include output devices, for example but not limited to, a printer, display, facsimile device, etc. Finally, the peripherals may further include devices that communicate both inputs and outputs, for instance but not limited to, a modulator/demodulator (modem; for accessing another device, system, or network), a radio frequency (RF) or other transceiver, a network device such as a bridge, a router, etc.

If the computer is a personal computer, workstation, or the like, the software in the memory may further include a basic input output system (BIOS). The BIOS is a set of essential software routines that initialize and test hardware at startup, start the operating system, and support the transfer of data among the hardware devices. The BIOS is stored in the ROM so that the BIOS can be executed when the computer is activated.

When computer is in operation, the processor is configured to execute software stored within the memory, to communicate data to and from the memory, and to generally control operations of the computer in accordance with the software.

It should be noted that the method for automating the creation of scripts including inoculation data can be stored on any computer readable medium for use by or in connection with any computer related system or method. In the context of this document, a "computer-readable medium" can be any means that can store, communicate, propagate, or transport the program for use by or in connection with the instruction execution system, system, or device. The computer-readable medium can be, for example but not limited to, an electronic, magnetic, optical, electromagnetic, infrared, or semiconductor system, system, device, or propagation medium. A non-exhaustive example set of the computer-readable medium would include the following: an electrical connection having one or more wires, a portable computer diskette, a random access memory (RAM), a read-only memory (ROM), an erasable programmable read-only memory (EPROM, EEPROM, or Flash memory), and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the method for automating the creation of scripts including inoculation data is implemented in hardware, it can be implemented with any or a combination of the following technologies, which are each well known in the art: a discrete logic circuit(s) having logic gates for implementing logic functions upon data signals, an application specific integrated circuit(s) (ASIC) having appropriate combinatorial logic gates, a programmable gate array(s) (PGA), a field programmable gate array(s) (FPGA), etc.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen, and described to illustrate the principles of the invention and its practical application to thereby enable one of ordinary skill in the art to utilize the invention in various embodiments and with various modifications for a variety of uses. Such modifications and variations are within the scope of the invention as determined by the appended claims when interpreted in accordance with the breadth to which they are fairly and legally entitled.

What is claimed is:

1. A computer-implemented method for automating creation of scripts for use with managed computer systems, the method comprising:

storing, in a database accessible to one or more computer systems, a set of descriptions of software applications, a description of a software application including one or more items that uniquely identify the software application or that describe a resource accessed by the software application during execution of the software application;

retrieving, with one or more processors associated with the one or more computer systems, at least one description of at least one software application from the database in response to a query at the database for at least one of a registry key, a file system object, and a service;

creating, with the one or more processors associated with the one or more computer systems, an introductory section in a script that causes security components of the managed computer systems to apply resource restrictions to software applications, the introductory section in the script specifying that the script is formatted to be directly usable by registry utilities natively provided by operating systems of the managed computer systems to configure the security components;

generating, with the one or more processors associated with the one or more computer systems, a set of rules that manage access to a resource on the managed computer systems when characteristics of software applications on the managed computer systems match items from the at least one description of the at least one software application incorporated into one or more rules in the set of rules;

determining whether to create, with the one or more processors associated with the one or more computer systems, a first type of entry in the script based on the set of rules, the first type of entry corresponding to a security component setting of a security component on the managed computer systems adapted to control access permissions for registry keys on the managed computer systems when characteristics of software applications on the managed computer systems match one or more registry rules in the set of rules;

determining whether to create, with the one or more processors associated with the one or more computer systems, a second type of entry in the script based on the set of rules, the second type of entry corresponding to a security component setting of a security component on the managed computer systems adapted to control access permissions for file system objects on the managed computer systems when characteristics of software applications on the managed computer systems match one or more file system object rules in the set of rules;

determining whether to create, with the one or more processors associated with the one or more computer systems, a third type of entry in the script based on the set of rules, the third type of entry corresponding to a security component setting of a security component on the managed computer system adapted to control access permissions for services on the managed computer systems when characteristics of software applications on the managed computer systems match one or more services rules in the set of rules; and storing the script in a storage device associated with the one or more computer systems operated by the inoculation data provider, wherein the stored script includes at least one of the first, second, and third type of entry.

2. The method of claim 1, wherein the script is further adapted to add inoculation data to a configuration database of the managed computer systems.

3. The method of claim 1, wherein one or more items in the at least one description of the at least one software application specify a location associated with the resource accessed by the at least one software application and a type for the location associated with the resource.

4. The method of claim 1, further comprising communicating the script to at least one of the managed computer systems.

5. The method of claim 1, wherein one or more rules in the set of rules manage access to a resource of the managed computers systems that includes memory of the managed computer systems.

6. The method of claim 1, wherein one or more rules in the set of rules manage access to a resource of the managed computers systems that includes a service of the managed computer systems.

7. The method of claim 1, wherein one or more rules in the set of rules manage access to a resource of the managed computers systems that includes configuration data of the managed computer systems.

8. The method of claim 1, wherein one or more rules in the set of rules manage access to a resource of the managed computers systems that includes a storage path of the managed computer systems.

9. The method of claim 1, wherein one or more rules in the set of rules manage access to a resource of the managed computers systems that includes a dynamic link library of the managed computer systems.

10. The method of claim 1, wherein one or more rules in the set of rules manage access to a resource of the managed computers systems that includes an archive of the managed computer systems.

11. The method of claim 1, wherein one or more rules in the set of rules manage access to a resource of the managed computers systems that includes processor priority of the managed computer systems.

12. The method of claim 1, wherein one or more rules in the set of rules manage access to a resource of the managed computers systems that includes a browser cookie of the managed computer systems.

13. The method of claim 1, wherein the at least one description of the at least one software application specifies an ActiveX class identification associated with the at least one software application.

14. The method of claim 1, wherein the at least one description of the at least one software application specifies a Java applet class identification associated with the at least one software application.

15. The method of claim 1, wherein the script is adapted to configure the security components of the managed computer systems to deny access to the resource.

16. The method of claim 1, wherein the script is adapted to configure the security components of the managed computer systems to allow access to the resource.

17. A non-transitory computer-readable medium storing computer-executable program code for automating creation of scripts for use with managed computer systems, the non-transitory computer-readable medium comprising:

code for storing a set of descriptions of software applications in a database, a description of a software application including one or more items that uniquely identify the software application or that describe a resource accessed by the software application during execution of the software application;

code for retrieving at least one description of at least one software application from the database in response to a query at the database for at least one of a registry key, a file system object, and a service;

code for creating an introductory section in a script that causes security components of the managed computer systems to apply resource restrictions to software applications, the introductory section in the script specifying that the script is formatted to be directly usable by registry utilities natively provided by operating systems of the managed computer systems to configure the security components;

code for generating a set of rules that manage access to a resource on the managed computer systems when characteristics of software applications on the managed computer systems match items from the at least one description of the at least one software application incorporated into one or more rules in the set of rules;

code for determining whether to create a first type of entry in the script based on the set of rules, the first type of entry corresponding to a security component setting of a security component on the managed computer systems adapted to control access permissions for registry keys on the managed computer systems when characteristics of software applications on the managed computer systems match one or more registry rules in the set of rules;

code for determining whether to create a second type of entry in the script based on the set of rules, the second type of entry corresponding to a security component setting of a security component on the managed computer systems adapted to control access permissions for file system objects on the managed computer systems when characteristics of software applications on the managed computer systems match one or more file system object rules in the set of rules;

code for determining whether to create a third type of entry in the script based on the set of rules, the third type of entry corresponding to a security component setting of a security component on the managed computer system adapted to control access permissions for services on the managed computer systems when characteristics of software applications on the managed computer systems match one or more services rules in the set of rules; and code for storing the script in a storage device, wherein the stored script includes at least one of the first, second, and third type of entry.

18. The non-transitory computer-readable medium of claim 17, wherein the script is further adapted to add inoculation data to a configuration database of the managed computer systems.

19. The non-transitory computer-readable medium of claim 17, wherein one or more items in the at least one description of the at least one software application specify a location associated with the resource accessed by the at least one software application and a type for the location associated with the resource.

20. The non-transitory computer-readable medium of claim 17, further comprising code for communicating the script to at least one of the managed computer systems.

21. The non-transitory computer-readable medium of claim 17, wherein one or more rules in the set of rules manage access to a resource of the managed computers systems that includes memory of the managed computer systems.

22. The non-transitory computer-readable medium of claim 17, wherein one or more rules in the set of rules manage access to a resource of the managed computers systems that includes a service of the managed computer systems.

23. The non-transitory computer-readable medium of claim 17, wherein one or more rules in the set of rules manage access to a resource of the managed computers systems that includes configuration data of the managed computer systems.

24. The non-transitory computer-readable medium of claim 17, wherein one or more rules in the set of rules manage access to a resource of the managed computers systems that includes a storage path of the managed computer systems.

25. The non-transitory computer-readable medium of claim 17, wherein one or more rules in the set of rules manage access to a resource of the managed computers systems that includes a dynamic link library of the managed computer systems.

26. The non-transitory computer-readable medium of claim 17, wherein one or more rules in the set of rules manage access to a resource of the managed computers systems that includes an archive of the managed computer systems.

27. The non-transitory computer-readable medium of claim 17, wherein one or more rules in the set of rules manage access to a resource of the managed computers systems that includes processor priority of the managed computer systems.

28. The non-transitory computer-readable medium of claim 17, wherein one or more rules in the set of rules manage access to a resource of the managed computers systems that includes a browser cookie of the managed computer systems.

29. The non-transitory computer-readable medium of claim 17, wherein the at least one description of the at least one software application specifies an ActiveX class identification associated with the at least one software application.

30. The non-transitory computer-readable medium of claim 17, wherein the at least one description of the at least one software application specifies a Java applet class identification associated with the at least one software application.

31. The non-transitory computer-readable medium of claim 17, wherein the script is adapted to configure the security components of the managed computer systems to deny access to the resource.

32. The non-transitory computer-readable medium of claim 17, wherein the script is adapted to configure the security components of the managed computer systems to allow access to the resource.

* * * * *